(12) United States Patent
Denner et al.

(10) Patent No.: US 8,285,796 B2
(45) Date of Patent: *Oct. 9, 2012

(54) SYSTEM AND METHOD FOR CIRCUMVENTING INSTANT MESSAGING DO-NOT-DISTURB

(75) Inventors: Gary Denner, Celbridge (IE); Cynthia E. Barber-Mingo, Westford, MA (US); Ruthie D. Lyle, Durham, NC (US); Patrick Joseph O'Sullivan, Ballsbridge (IE); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

This patent is subject to a terminal disclaimer.

(21) Appl. No.: 12/346,201

(22) Filed: Dec. 30, 2008

(65) Prior Publication Data

US 2010/0169431 A1 Jul. 1, 2010

(51) Int. Cl.
*G06F 15/16* (2006.01)
(52) U.S. Cl. ........................ 709/206; 709/201
(58) Field of Classification Search .......... 709/206
See application file for complete search history.

(56) References Cited

U.S. PATENT DOCUMENTS

| | | | |
|---|---|---|---|
| 7,606,862 B2* | 10/2009 | Swearingen et al. | 709/206 |
| 2003/0204720 A1* | 10/2003 | Schoen et al. | 713/153 |
| 2003/0229670 A1* | 12/2003 | Beyda | 709/206 |
| 2004/0223599 A1* | 11/2004 | Bear et al. | 379/207.02 |
| 2005/0132011 A1 | 6/2005 | Muller et al. | |
| 2005/0192039 A1* | 9/2005 | Xue et al. | 455/517 |
| 2005/0203916 A1 | 9/2005 | Hirose | |
| 2005/0223075 A1* | 10/2005 | Swearingen et al. | 709/207 |
| 2006/0036688 A1 | 2/2006 | McMahan et al. | |
| 2006/0190547 A1 | 8/2006 | Bhogal et al. | |
| 2008/0002820 A1 | 1/2008 | Shtiegman et al. | |
| 2008/0126481 A1 | 5/2008 | Chakra et al. | |
| 2009/0083827 A1 | 3/2009 | Denner et al. | |
| 2010/0115033 A1* | 5/2010 | Geffner et al. | 709/206 |
| 2010/0233995 A1 | 9/2010 | Gopalaswamy et al. | |

OTHER PUBLICATIONS

Avrahami, Daniel et al., "QnA: Augmenting an Instant Messaging Client to Balance User Responsiveness and Performance", Conference '04, ACM, 2004, pp. 1-4.

Cutrell, Edward et al., "Notification, Disruption, and Memory: Effects of Messaging Interruptions on Memory and Performance", Microsoft Research, One Microsoft Way, Redmond, WA 98052 USA, pp. 1-7.

LeeTiernan, Scott et al., "Effective Notification Systems Depend on User Trust", Microsoft Research, One Microsoft Way, Redmond, WA 98052 USA, pp. 1-2.

(Continued)

*Primary Examiner* — Thu Nguyen
*Assistant Examiner* — Neeraj Utreja
(74) *Attorney, Agent, or Firm* — Holland & Knight LLP; Brian J. Colandreo, Esq.; Michael T. Abramson, Esq.

(57) ABSTRACT

A system and method for circumventing a do-not-disturb status of an instant messaging user including defining requesting, from one or more do not disturb circumvention mediators, do-not-disturb status circumvention of an instant messaging user. Circumvention permission for the do-not-disturb status of the instant messaging user is received. The do-not-disturb status of the instant messaging user is circumvented based upon, at least in part, the circumvention permission.

19 Claims, 5 Drawing Sheets

OTHER PUBLICATIONS http://www.microsoft.com/smallbusiness/resources/technology/communications/10_tips_for_using_instant_messaging_for_business.mspx, AMA/ePolicy Institute Research, pp. 1-19.

http://www.zdnetasia.com/news/security/0,39044215,39222828,00.htm, ZDNet Asia News, downloaded Feb. 2, 2012, pp. 1-6.

http://www.carrollcommunications.com/ipoffice/5donotdisturb.html, downloaded Feb. 2, 2012, pp. 1-2.

http://www.scrtc.com/donotdisturbservice.html, downloaded on Apr. 27, 2012, pp. 1-2.

Oasis, Assertions and Protocol for the Oasis Security Assertion Markup Language (SAML) V1.1, Oasis Standard Sep. 2, 2003, pp. 1-53.

Mahy et al., "A Call Control and Multi-party Usage Framework for the session Initiation Protocol (SIP)," http://www.ietf.org/internet-drafts/draft-ietf-sipping-cc-framework-05.txt, downloaded Apr. 27, 2012 pp. 1-46.

http://www.ecma-international.org/publications/standards/Ecma-193.htm, downloaded on Feb. 2, 2012, pp. 1-2.

\* cited by examiner

SYSTEM AND METHOD FOR CIRCUMVENTING INSTANT MESSAGING DO-NOT-DISTURB

TECHNICAL FIELD

This disclosure relates to instant messaging and, more particularly, to systems and methods for circumventing a do not disturb status in instant messaging systems.

BACKGROUND

Instant messaging provides real-time text based communication between two or more users interacting via computers or mobile devices. The more immediate and direct interaction provided by instant messaging often tends to more closely resemble a conversation, as compared to the more "letter like" format of email. The direct interaction between users can provide highly effective and convenient collaboration. For example, problems of unanswered emails and unreturned phone messages can be avoided.

While instant messaging can be a very useful tool for communication and collaboration, there are times when a user does not wish to be bothered or interrupted. This convenience is provided by a "do not disturb" ("DND") feature in the instant messaging application. The do-not-disturb feature of an instant messaging system is typically enforced from the receivers' client by setting an associated status. Once this status is set it prevents other users from contacting the person until such time as the person returns to an active (or similar) status. However, situations can arise when it is deemed necessary to contact a person who is operating in do-not-disturb status. Conventional instant messaging systems do not provide a do-not-disturb override capability. Therefore, once do-not-disturb status has been activated, the instant messaging user is unreachable by instant message until the user returns to active status.

SUMMARY OF THE DISCLOSURE

In a first implementation, a method includes requesting, from one or more do not disturb circumvention mediators, do-not-disturb status circumvention of an instant messaging user. Circumvention permission for the do-not-disturb status of the instant messaging user is received. The do-not-disturb status of the instant messaging user is circumvented based upon, at least in part, the circumvention permission.

One or more of the following features may be included. Requesting do-not-disturb circumvention permissions may include identifying the one or more do-not-disturb circumvention mediators for the instant messaging user. The one or more do-not-disturb circumvention mediators for the instant messaging user may include a designated mediator. Identifying the one or more do-not-disturb circumvention mediators may include determining one or more do-not-disturb circumvention mediators for the instant messaging user. Determining one or more do-not-disturb circumvention mediators may include determining one or more do-not-disturb circumvention mediators for the instant messaging user based upon, at least in part, an organizational structure.

Receiving circumvention permission for the do-not-disturb status of the instant messaging user may include receiving a circumvention certificate. Receiving the circumvention certificate may include receiving the circumvention certificate from one or more of the one or more do-not-disturb circumvention mediators. Receiving the circumvention certificate may include receiving the circumvention certificate from an authentication source.

The circumvention permission for the do-not-disturb status of the instant messaging user may include one or more associated circumvention restrictions. The one or more circumvention restrictions associated with the circumvention permission may include a time-wise duration of the circumvention permission.

According to another implementation, a computer program product includes a computer readable medium having a plurality of instructions stored on it. When executed by a processor, the instructions cause the processor to perform operations including requesting, from one or more do not disturb circumvention mediators, do-not-disturb status circumvention of an instant messaging user. Circumvention permission for the do-not-disturb status of the instant messaging user are received. The do-not-disturb status of the instant messaging user is circumvented based upon, at least in part, the circumvention permission.

One or more of the following features may be included. The instructions for requesting do-not-disturb circumvention permissions may include instructions for identifying the one or more do-not-disturb circumvention mediators for the instant messaging user. The one or more do-not-disturb circumvention mediators for the instant messaging user may include a designated mediator. The instructions for identifying the one or more do-not-disturb circumvention mediators may include instructions for determining one or more do-not-disturb circumvention mediators for the instant messaging user. The instructions for determining one or more do-not-disturb circumvention mediators may include instructions for determining one or more do-not-disturb circumvention mediators for the instant messaging user based upon, at least in part, an organizational structure.

The instructions for receiving circumvention permission for the do-not-disturb status of the instant messaging user may include instructions for receiving a circumvention certificate. The instructions for receiving the circumvention certificate may include instructions for receiving the circumvention certificate from one or more of the one or more do-not-disturb circumvention mediators. The instructions for receiving the circumvention certificate may include instructions for receiving the circumvention certificate from an authentication source.

The circumvention permission for the do-not-disturb status of the instant messaging user may include one or more associated circumvention restrictions. The one or more circumvention restrictions associated with the circumvention permission may include a time-wise duration of the circumvention permission.

The details of one or more implementations are set forth in the accompanying drawings and the description below. Other features and advantages will become apparent from the description, the drawings, and the claims.

DETAILED DESCRIPTION

Figure 1:
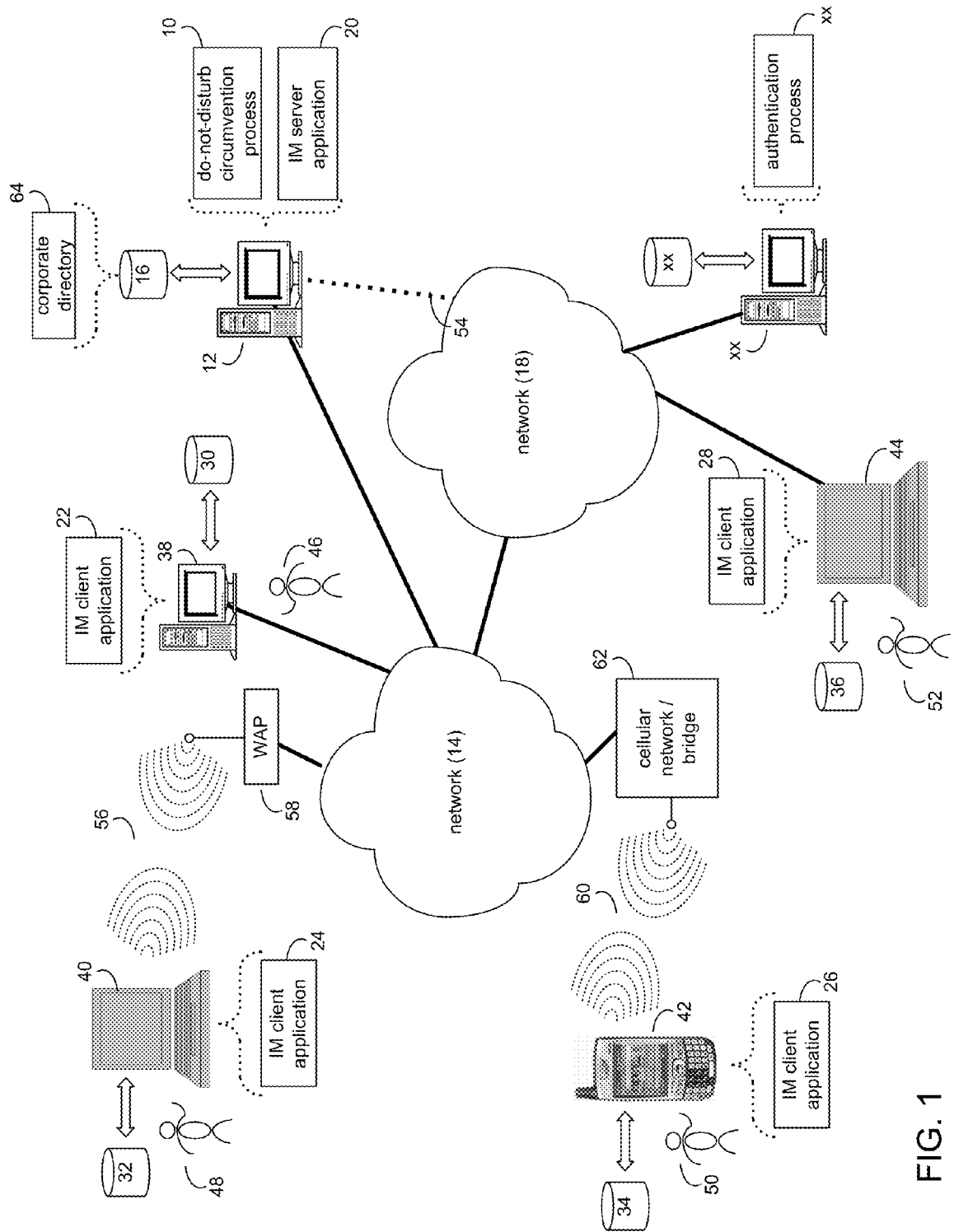
FIG. 1 diagrammatically depicts a do-not-disturb circumvention process and an instant messaging application coupled to a distributed computing network.

System Overview:

Referring to FIG. 1, there is shown do-not-disturb circumvention process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Alternatively, do-not-disturb circumvention process 10 may reside on and be executed, in whole or in part, by a client electronic device, such as a personal computer, notebook computer, personal digital assistant, or the like.

As will be discussed below in greater detail, do-not-disturb circumvention process 10 may request, from one or more do-not-disturb circumvention mediators, do-not-disturb status circumvention of an instant messaging user. Circumvention permission for the do-not-disturb status of the instant messaging user may be received. The do-not-disturb status of the instant messaging user may be circumvented based upon, at least in part, the circumvention permission.

The instruction sets and subroutines of DND circumvention process 10, which may be stored on storage device 16 coupled to server computer 12, may be executed by one or more processors (not shown) and one or more memory architectures (not shown) incorporated into server computer 12. Storage device 16 (i.e., a non-transitory computer readable medium) may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14. (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an instant messaging ("IM") server application (e.g., IM server application 20), examples of which may include, but are not limited to Lotus® Sametime®, Microsoft Office Live Communications Server, Jabber® XCP™, and AOL Instant Messenger® (Lotus and Sametime are registered trademarks of International Business Machines Corporation in the United States, other countries, or both; Jabber is a registered trademark of Jabber Inc. in the United States, other countries, or both; Jabber XCP is a trademark of Jabber Inc. in the United States, other countries, or both; and AOL Instant Messenger is a registered trademark of AOL LLC in the United States, other countries, or both) Instant messaging server application 20 may route instant messages to instant messaging client applications, e.g., instant messaging client applications 22, 24, 26, 28, examples of which may include but are not limited to Lotus Sametime, Microsoft Office Communicator, Google Talk™, and AOL Instant Messenger, for example (Google Talk is a trademark of Google Inc. in the United States, other countries, or both). Do-not-disturb circumvention process 10 may be a stand alone application that interfaces with instant messaging server application 20 or an applet/application that is executed within instant messaging server application 20.

The instruction sets and subroutines of instant messaging server application 20, which may be stored on storage device 16 coupled to server computer 12 may be executed by one or more processors (not shown) and one or more memory architectures (not shown) incorporated into server computer 12.

As mentioned above, in addition/as an alternative to being a server-based application residing on server computer 12, the do-not-disturb circumvention process may be a client-side application (not shown) residing on one or more client electronic device 38, 40, 42, 44 (e.g., stored on storage device 30, 32, 34, 36, respectively), and executed by a processor (not shown) and memory architecture (not shown) incorporated into the one or more client electronic devices. The client-side do-not-disturb circumvention process may be a stand alone application that interfaces with an instant messaging client application (e.g., instant messaging client applications 22, 24, 26, 28), or may be an applet/application that is executed within an instant messaging client application. As such, the do-not-disturb circumvention process may be a client-side application, a server-based application, or a hybrid client-side/server-based application, which may be executed, in whole or in part, by server computer 12, and/or one or more of client electronic device (e.g., client electronic devices 38, 40, 42, 44).

The instruction sets and subroutines of instant messaging client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 (i.e., a non-transitory computer readable medium) may include but are not limited to: hard disk drives; solid state drive; tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, personal digital assistant 42. notebook computer 44, a data-enabled, cellular telephone (not shown), and a dedicated network device (not shown), for example. Using instant messaging client applications 22, 24, 26, 28, users 46, 48, 50, 52 may access instant messaging server application 20 and may receive, create, and manage instant messages.

Users 46, 48, 50, 52 may access instant messaging server application 20 directly through the device on which the instant messaging client application (e.g., instant messaging client applications 22, 24, 26, 28) is executed, namely client electronic devices 38, 40, 42, 44, for example. Users 46, 48, 50, 52 may access instant messaging server application 20 directly through network 14 or through secondary network 18. Further, server computer 12 (i.e., the computer that executes instant messaging server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

Figure 2:
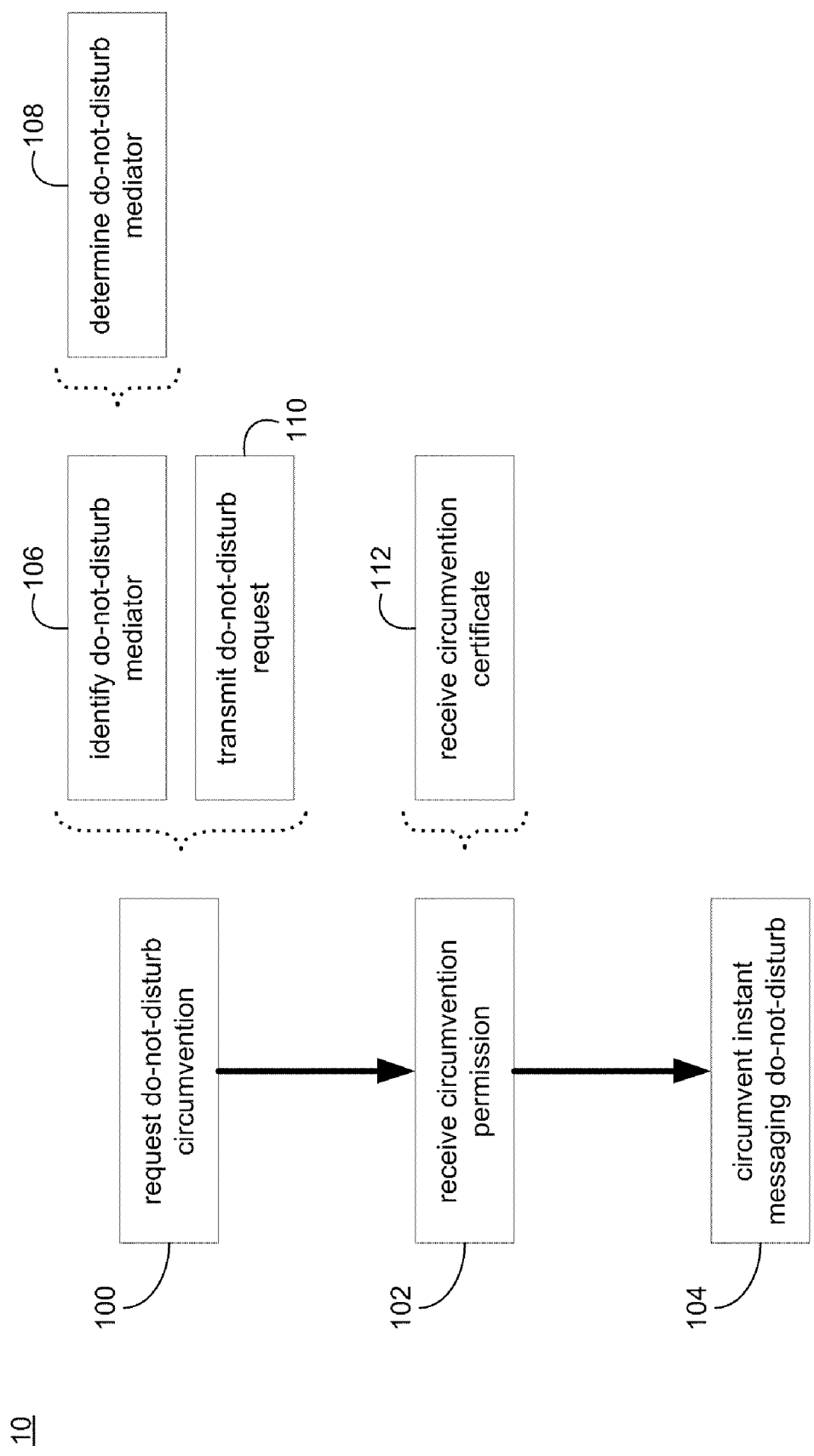
FIG. 2 is a flowchart of a process executed by the do-not-disturb circumvention process of FIG. 1.

The Do-Not-Disturb Circumvention Process:

Referring also to FIG. 2, do-not-disturb circumvention process 10 may request 100, from one or more do-not-disturb circumvention mediators, do-not-disturb status circumvention of an instant messaging user. Do-not-disturb circumvention process 10 may receive 102 circumvention permission for the do-not-disturb status of the instant messaging user. The do-not-disturb status of the instant messaging user may be circumvented 104 based upon, at least in part, the received 102 circumvention permission.

Figure 3:
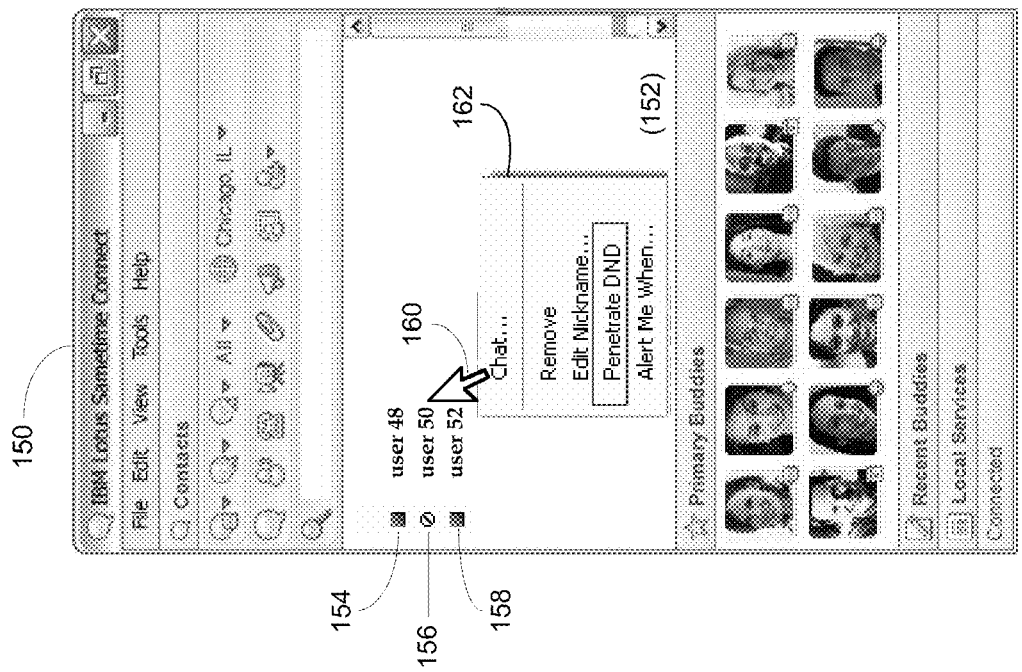
FIG. 3 is a diagrammatic view of an instant messaging user interface rendered by the do-not-disturb circumvention process and/or the instant messaging application of FIG. 1.

For example an instant messaging client application (e.g., instant messaging client application 22) may allow a user (e.g., user 46) to exchange instant messages with one or more other users. Referring also to FIG. 3, instant messaging client application 22 may render instant messaging contacts display screen 150. Instant messaging contacts display screen 150 may include a listing of user 46's instant messaging contacts (e.g., user 48, user 50, user 52), along with an associated graphical status indicator (e.g., status indicators 154, 156, 158) of the respective status of the various instant messaging contacts. As shown (e.g., by status indicator 156), one or more instant messaging contacts (e.g., user 50) may be in an instant messaging do-not-disturb status. Do-not-disturb circumvention process 10 may request 100, from one or more do-not-disturb circumvention mediators, do-not-disturb status circumvention of the do-not-disturb status instant messaging user (e.g., user 50).

For example, user 46 may select, via onscreen pointer 160 (which may be controlled by a pointing device, such as a mouse; not shown), the instant messaging user in do-not-disturb status (i.e., user 50). Selecting user 50 may result in do-not-disturb circumvention process 10 (alone or in conjunction with one or more of instant messaging server application 20 and instant messaging client application 22) rendering pop-up menu 162. Pop-up menu 162 may include various options, including "Penetrate DND". As shown, pop-up menu 162 may include various additional/alternative options, the number and nature of which may vary according to user need and design criteria. As such the options included within pop-up menu 162 should not be construed as a limitation on the present disclosure.

User 46 may select, e.g., via onscreen pointer 160, "Penetrate DND" option from within pop-up menu 162. Selecting "Penetrate DND" option may cause do-not-disturb circumvention process 10 to request 100, from one or more do-not-disturb circumvention mediators (e.g., a third party having the authority to grant do-not-disturb circumvention permissions), do-not-disturb status circumvention of user 50. Do-not-disturb circumvention permission may allow user 46 to send an instant message to user 50, notwithstanding user 50's instant messaging do-not-disturb status.

Requesting 100 do-not-disturb circumvention permissions may include identifying 106 the one or more do-not-disturb circumvention mediators for the instant messaging user. The one or more do-not-disturb circumvention mediators for the instant messaging user may include a designated mediator. The do-not-disturb circumvention mediator may include an individual who may be "nominated" (e.g., designated or identified) by a trusted authority, such as a system administrator. The do-not-disturb mediator may be able to provide assistance in unique circumstances, for example being able to grant rights for do-not-disturb circumvention. The designated mediator may be a user having the authority to grant do-not-disturb circumvention permissions relative to all instant messaging users and/or relative to only a portion of instant messaging users. Identifying 106 the one or more do-not-disturb circumvention mediators for the instant messaging user (e.g., user 50) may include, for example, accessing a look-up table, list, etc., of do-not-disturb circumvention mediators.

In the latter case (e.g., in which various different do-not-disturb circumvention mediators only have authority to grant do-not-disturb circumvention permissions relative to specified instant messaging users), identifying 106 the one or more do-not-disturb circumvention mediators may include determining 108 one or more do-not-disturb circumvention mediators for the instant messaging user (i.e., user 50). That is, identifying 106 the one or more do-not-disturb circumvention mediators may include determining 108 an appropriate do-not-disturb circumvention mediator for user 50. Determining 108 one or more do-not-disturb circumvention mediators for user 50 may include, for example, accessing an instant messaging user profile for user 50, a relational database of instant messaging users and do-not-disturb circumvention mediators, or the like.

Further, determining 108 one or more do-not-disturb circumvention mediators may include determining one or more do-not-disturb circumvention mediators for the instant messaging user based upon, at least in part, an organizational structure. For example, the only users having the authority to grant do-not-disturb circumvention permissions (i.e., do-not-disturb circumvention mediators) for a user may include the user's administrative assistant and immediate supervisor. However, such examples should be understood to be for illustrative purposed only and not to be a limitation of this disclosure, as other individuals may be do-not-disturb circumvention mediators for a user based upon various criteria and/or preferences.

Continuing with the foregoing example, do-not-disturb circumvention process 10 may determine 108 one or more do-not-disturb circumvention mediators based upon an organizational structure, e.g., of a corporation, organization, agency, or the like, which may identify user 50's administrative assistant and/or immediate supervisor. The organizational structure may be embodied, for example, in a corporate directory (e.g., corporate directory 64 residing on server computer 12, or another server computer accessible by do-not-disturb circumvention process 10), such as an LDAP directory. Accordingly, do-not-disturb circumvention process 10 may access corporate directory 64 to determine 108 one or more do-not-disturb circumvention mediators for user 50.

Requesting 100 do-not-disturb status circumvention of an instant messaging user, from one or more do-not-disturb circumvention mediators, may include transmitting 110 a do-not-disturb circumvention request to the one or more do-not-disturb circumvention mediators. For example, and continuing with the above-stated example, do-not-disturb circumvention process 10 may identify 108 user 52 as being a do-not-disturb circumvention mediator for user 50 (e.g., user 52 may be a designated mediator, or an appropriate do-not-disturb circumvention mediator for user 52 based upon, at least in part, an organizational structured defined, e.g., within corporate directory 64). Do-not-disturb circumvention process 10 may transmit 110 a do-not-disturb circumvention request to user 52 on behalf of user 46. The do-not-disturb circumvention request transmitted 110 to user 52 may include an automatically generated request (e.g., a form request). Alternatively, do-not-disturb circumvention process 10 may, alone and/or in conjunction with one or more of instant messaging server application 20 and instant messaging client application 22, initiate an instant messaging chat between user 46 and user 52, facilitating the request to user 52 to circumvent user 50's do-not-disturb status by user 46.

Figure 4:
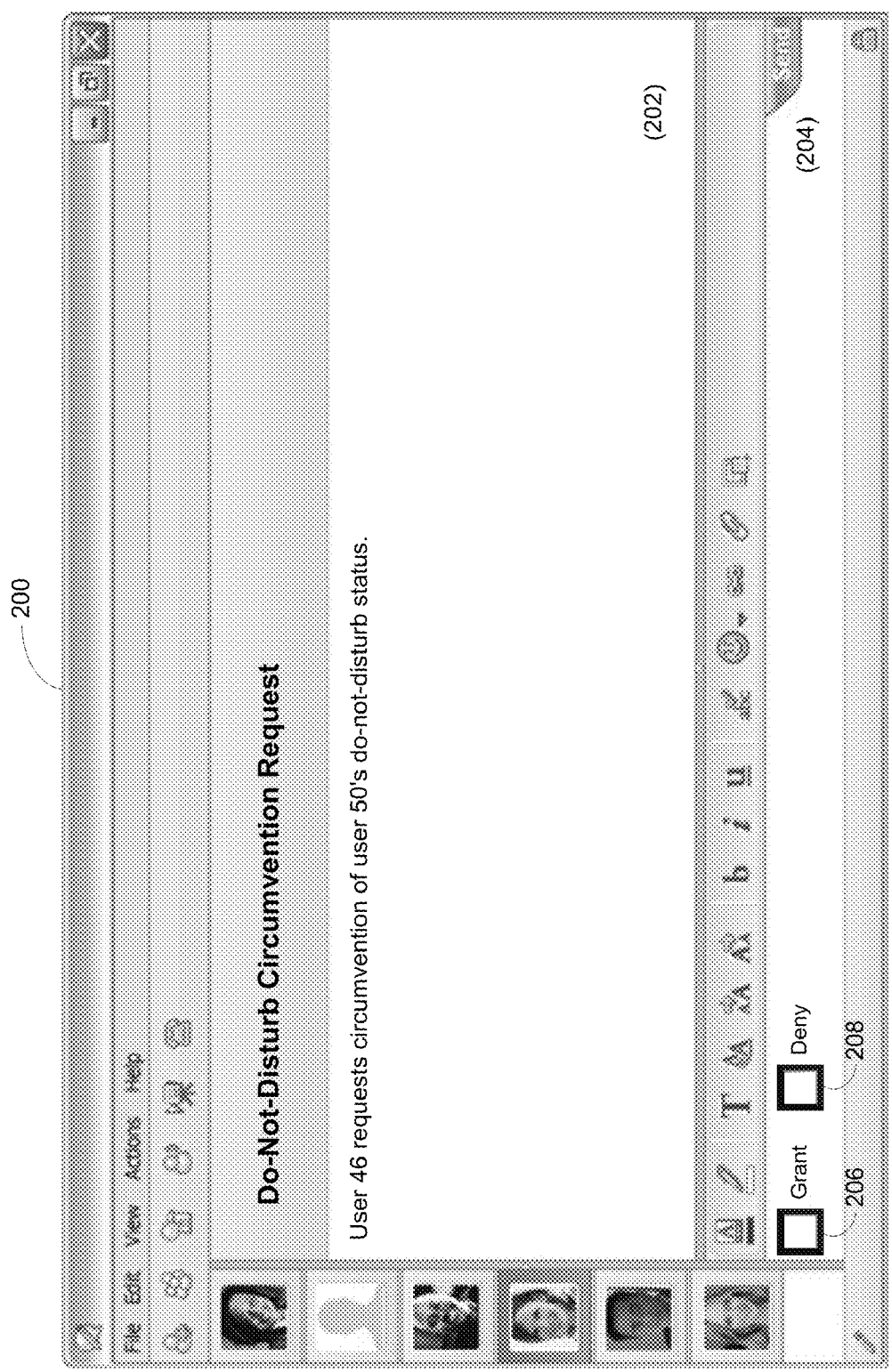
FIG. 4 is a diagrammatic view an instant messaging user interface rendered by the do-not-disturb circumvention process and/or the instant messaging application of FIG. 1.

Continuing with the above-stated example, and referring also to FIG. 4, user 52 may receive do-not-disturb circumvention request 200 in the form of an instant message (as shown), as an email, or via other suitable communication. Do-not-disturb circumvention request 200 may be rendered by instant messaging client application 28 (alone or in conjunction with do-not-disturb circumvention process 10 and/or instant messaging server application 20). Do-not-disturb circumvention request 200 may include circumvention request message 202 (i.e., "user 46 would like to penetrate user 50"). Additionally, do-not-disturb circumvention request 200 may include, for example, grant button 206 and deny button 208. User 52 may select, e.g., via onscreen pointer 160, grant button 206 to grant permission for user 46 to circumvent the do-not-disturb status of user 50. In a related manner, if user 52 wishes to respect user 50's do-not-disturb status (e.g., user 52 does not find user 46's reason for circumventing user 50's do-not-disturb status to be sufficient to warrant the interruption), user 52 may select deny button 208.

Continuing with the above-stated example in which user 52 may grant (e.g., by selecting grant button 206) user 46's request to circumvent user 50's do-not disturb status, selecting grant button 206 may result in do-not-disturb circumvention process 10 receiving 102 circumvention permissions for the do-not-disturb status of user 50 by user 46. Receiving 102 circumvention permissions for the do-not-disturb status of user 50 by user 46 may include receiving 112 a circumvention certificate. The circumvention certificate may be, for example, a digital certificate, a token, or other mechanism for authenticating user 46's permission to circumvent the do-not-disturb status of user 50.

Receiving 112 the circumvention certificate may include receiving the circumvention certificate from one or more of the one or more do-not-disturb circumvention mediators. For example, and continuing with the above stated example, upon user 52 selecting grant button 206, a circumvention certificate may be transmitted to user 46 from user 52 (e.g., via instant messaging client application 28, alone or in conjunction with one or more of do-not-disturb circumvention process 10 and/or instant messaging server application 20). The circumvention certificate may be received 112 by user 46 (e.g., via one or more of do-not-disturb circumvention process 10, instant messaging client application 22, and/or instant messaging server application 20).

In another embodiment, receiving 112 the circumvention certificate may include receiving 112 the circumvention certificate from an authentication source. An example of an authentication source may include, but is not limited to, for example an authentication server (not shown). For example, upon user 52 selecting grant button 206, instant messaging client application 28 (alone or in conjunction with one or more of do-not-disturb circumvention process 10 and/or instant messaging server application 20) may transmit a request for the generation of a circumvention certificate to the authentication server. The authentication server may, accordingly, generate a circumvention certificate for user 46 to circumvent the do-not-disturb status of user 50. The authentication server may transmit the circumvention certificate to do-not-disturb circumvention process 10 (e.g., via one or more of instant messaging server application 20 and/or instant messaging client application 22). Accordingly, do-not-disturb circumvention process 10 may receive 112 the circumvention certificate from the central authentication server.

The circumvention permissions received 102 by do-not-disturb circumvention process 10 for user 46 to circumvent the do-not-disturb status of user 50 may include one or more associated circumvention restrictions. The one or more associated circumvention restrictions may, for example, include system-wide restrictions placed on do-not-disturb circumventions and/or may include restrictions that may be applied to specific circumventing users. In the latter case, the one or more associated circumvention restrictions may be applied by the do-not-disturb circumvention mediator (e.g., user 52). In an embodiment in which do-not-disturb circumvention permissions may be granted via a circumvention certificate, the one or more associated circumvention restrictions may be an attribute of the circumvention certificate.

According to one example, the one or more circumvention restrictions associated with the circumvention permission may include a time-wise duration of the circumvention permission. For example, rather than being an enduring permission to always circumvent the do-not-disturb status of an instant messaging user, the permission may be for a limited amount of time only (e.g., 15 minutes, one hour, etc.). Similarly, the circumvention permission may be for a limited number of instant messaging exchanges (e.g., the circumvention permissions may allow the circumventing user to send a defined number of instant messages that will circumvent the do-not-disturb status of the instant messaging user).

Figure 5:
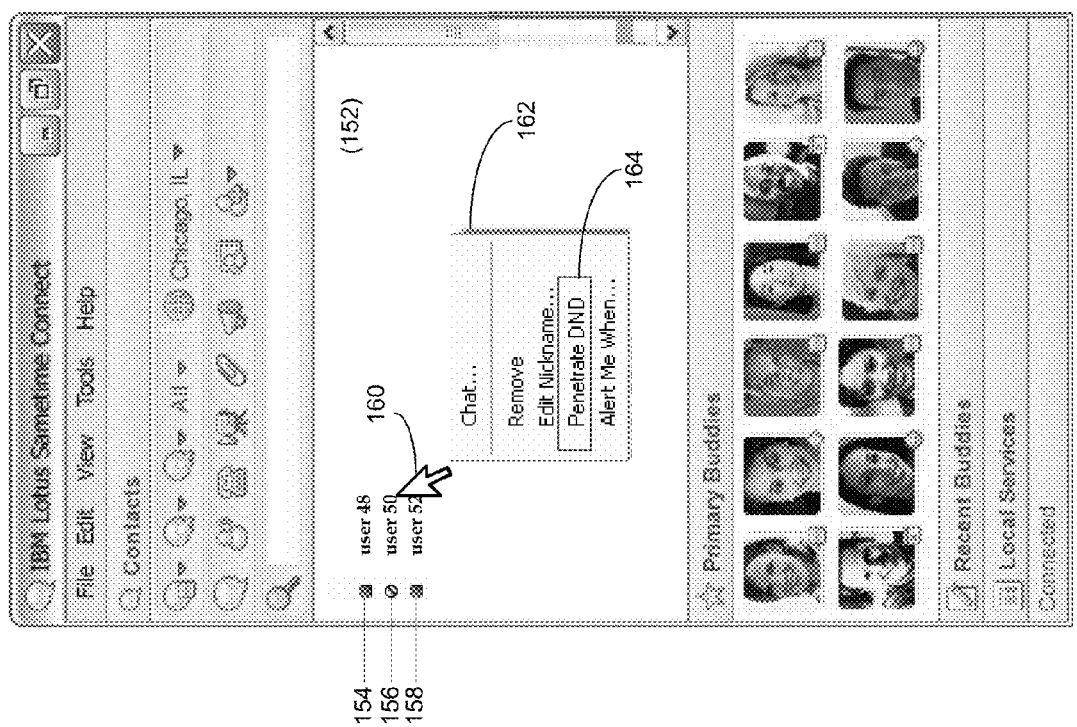
FIG. 5 is a diagrammatic view of an instant messaging user interface rendered by the do-not-disturb circumvention process and/or the instant messaging application of FIG. 1.

Do-not-disturb circumvention process 10 may allow a user to circumvent 104 the do-not-disturb status of the instant messaging user based upon the policy of circumvention rights. Continuing with the above-stated example, and with additional reference to FIG. 5, user 46 may have permissions to circumvent 104 the do-not-disturb status of user 50, e.g., based upon the received 102 circumvention permissions. User 46 may select user 50 in from contact list 152, e.g., using onscreen pointer 160 controlled by a pointing device (e.g., a mouse; not shown), and may "right click" on user 50. "Right clicking" on user 50 may result in do-not-disturb circumvention process 10 and/or instant messaging client application 22 rendering popup menu 164. Popup menu 164 may define one or more options including, for example, "Chat", "Remove", "Edit Nickname", "Penetrate DND", and "Notify Me When". User 46 may select "Penetrate DND", e.g., using onscreen pointer 160 controlled by the pointing device. By selecting "Penetrate DND", do-not-disturb circumvention process 10 may allow user 46 to circumvent 104 the do-not-disturb status of user 50, e.g., based upon the received 102 circumvention permission.

Circumventing 104 the do-not-disturb status of user 50 may allow user 46 to send an instant message directly to 50. Additionally/alternatively, do-not-disturb circumvention process 10 may notify user 50 that user 46 is attempting to send an instant message. For example, do-not-disturb circumvention process 10 may send a system notification to user 50 indicating that user 46 is attempting to instant message user 50. Various other notifications may be used to notify user 50 that user 46 intends to circumvent the do-not-disturb status of user 50.

A number of implementations have been described. Nevertheless, it will be understood that various modifications may be made. Accordingly, other implementations are within the scope of the following claims.

What is claimed is:

1. A method comprising:
   accessing a look-up table of do-not disturb circumvention mediators having authority to grant do-not disturb circumvention permission to one or more specified instant messaging users;
   determining an appropriate do-not disturb circumvention mediator for a second instant messaging user based upon, at least in part, the second instant messaging user and the look-up table of do-not disturb circumvention mediators;
   transmitting, by an instant messaging client associated with a first instant messaging user, to the appropriate do-not disturb circumvention mediator for the second instant messaging user, a request to circumvent a do-not-disturb status of the second instant messaging user;
   receiving, by the instant messaging client, circumvention permission for the do-not-disturb status of the second instant messaging user from the appropriate do-not disturb circumvention mediator for the second instant messaging user; and
   circumventing the do-not-disturb status of the second instant messaging user based upon, at least in part, the circumvention permission received from the appropriate do-not disturb circumvention mediator for the second instant messaging user.

2. The method of claim 1, wherein the one or more do-not-disturb circumvention mediators for the second instant messaging user includes a designated mediator.

3. The method of claim 1, wherein determining one or more do-not-disturb circumvention mediators includes determining one or more do-not-disturb circumvention mediators for the second instant messaging user based upon, at least in part, an organizational structure.

4. The method of claim 1, wherein receiving circumvention permission for the do-not-disturb status of the second instant messaging user includes receiving a circumvention certificate.

5. The method of claim 4, wherein receiving the circumvention certificate includes receiving the circumvention certificate from at least one of:
   one or more of the one or more do-not-disturb circumvention mediators; and
   an authentication source.

6. The method of claim 1, wherein the circumvention permission for the do-not-disturb status of the second instant messaging user includes one or more associated circumvention restrictions.

7. The method of claim 6, wherein the one or more circumvention restrictions associated with the circumvention permission include a time-wise duration of the circumvention permission.

8. The method of claim 1, wherein the instant message includes an option that, if selected, is configured to grant permission to circumvent the do-not-disturb status of the second instant messaging user.

9. A computer program product comprising a non-transitory computer readable medium having a plurality of instructions stored thereon, which, when executed by a processor, cause the processor to perform operations comprising:
   accessing a look-up table of do-not disturb circumvention mediators having authority to grant do-not disturb circumvention permission to one or more specified instant messaging users;
   determining an appropriate do-not disturb circumvention mediator for a second instant messaging user based upon, at least in part, the second instant messaging user and the look-up table of do-not disturb circumvention mediators;
   transmitting, by an instant messaging client associated with a first instant messaging user, to the appropriate do-not disturb circumvention mediator for the second instant messaging user, a request to circumvent a do-not-disturb status of the second instant messaging user;
   receiving, by the instant messaging client, circumvention permission for the do-not-disturb status of the second instant messaging user from the appropriate do-not disturb circumvention mediator for the second instant messaging user; and
   circumventing the do-not-disturb status of the second instant messaging user based upon, at least in part, the circumvention permission received from the appropriate do-not disturb circumvention mediator for the second instant messaging user.

10. The computer program product of claim 9, wherein the one or more do-not-disturb circumvention mediators for the second instant messaging user includes a designated mediator.

11. The computer program product of claim 9, wherein the instructions for determining one or more do-not-disturb circumvention mediators include instructions for determining one or more do-not-disturb circumvention mediators for the second instant messaging user based upon, at least in part, an organizational structure.

12. The computer program product of claim 9, wherein the instructions for receiving circumvention permission for the do-not-disturb status of the second instant messaging user include instructions for receiving a circumvention certificate.

13. The computer program product of claim 12, wherein the instructions for receiving the circumvention certificate include instructions for receiving the circumvention certificate from at least one of:
   one or more of the one or more do-not-disturb circumvention mediators; and
   an authentication source.

14. The computer program product of claim 9, wherein the circumvention permission for the do-not-disturb status of the second instant messaging user includes one or more associated circumvention restrictions.

15. The computer program product of claim 14, wherein the one or more circumvention restrictions associated with the circumvention permission include a time-wise duration of the circumvention permission.

16. The computer program product of claim 9, wherein the instant message includes an option that, if selected, is configured to grant permission to circumvent the do-not-disturb status of the second instant messaging user.

17. A method comprising:
accessing a look-up table of do-not disturb circumvention mediators having authority to grant do-not disturb circumvention permission to one or more specified instant messaging users;

determining an appropriate do-not disturb circumvention mediator for a second instant messaging user based upon, at least in part, the second instant messaging user and the look-up table of do-not disturb circumvention mediators;

transmitting, by an instant messaging server, to the appropriate do-not disturb circumvention mediator for the second instant messaging user, a request to circumvent a do-not-disturb status of the second instant messaging user;

receiving, by the instant messaging server, circumvention permission for the do-not-disturb status of the second instant messaging user from the appropriate do-not disturb circumvention mediator for the second instant messaging user; and circumventing the do-not-disturb status of the second instant messaging user based upon, at least in part, the circumvention permission received from the appropriate do-not disturb circumvention mediator for the second instant messaging user.

18. The method of claim 17, wherein determining an appropriate do-not disturb circumvention mediator for a second instant messaging user further comprises accessing an instant messaging user profile for the second instant messaging user.

19. The method of claim 17, wherein determining an appropriate do-not disturb circumvention mediator for a second instant messaging user further comprises accessing a relational database of instant messaging users and do-not disturb circumvention mediators.

* * * * *